United States Patent
Doleschel et al.

(10) Patent No.: US 8,992,361 B2
(45) Date of Patent: Mar. 31, 2015

(54) PLANETARY GEAR FOR VARIABLE TRANSMISSION

(71) Applicant: Airbus Helicopters Deutschland GmbH, Donauworth (DE)

(72) Inventors: Andreas Doleschel, Grosshelfendorf (DE); Martin Weidenthaler, Unterhaching (DE); Christian Wirth, Ismaning (DE); Franz Kurth, Ismaning (DE); Bernd-Robert Hohn, Munich (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 65 days.

(21) Appl. No.: 13/648,650

(22) Filed: Oct. 10, 2012

(65) Prior Publication Data

US 2013/0102431 A1 Apr. 25, 2013

(30) Foreign Application Priority Data

Oct. 20, 2011 (EP) .................................. 11400046

(51) Int. Cl.
*F16H 3/72* (2006.01)
*F16H 3/66* (2006.01)
*F16H 3/54* (2006.01)
*B64C 27/12* (2006.01)

(52) U.S. Cl.
CPC .. *F16H 3/66* (2013.01); *F16H 3/54* (2013.01); *F16H 3/725* (2013.01); *B64C 27/12* (2013.01); *F16H 2200/0034* (2013.01); *F16H 2200/0039* (2013.01); *F16H 2200/2005* (2013.01); *F16H 2200/2007* (2013.01); *F16H 2200/2035* (2013.01); *F16H 2200/2038* (2013.01); *F16H 2200/2041* (2013.01); *F16H 2200/2033* (2013.01); *F16H 2200/2097* (2013.01); *F16H 2200/2082* (2013.01)
USPC ...................................... 475/5; 475/8; 475/312

(58) Field of Classification Search
USPC .................... 475/5, 8, 151, 297, 312
See application file for complete search history.

(56) References Cited

U.S. PATENT DOCUMENTS

| | | | |
|---|---|---|---|
| 2,788,680 A * | 4/1957 | Miller | 475/312 |
| 3,209,618 A | 10/1965 | Schwab | |
| 4,559,848 A | 12/1985 | Kerr | |
| 5,030,187 A | 7/1991 | Asada | |
| 5,951,434 A | 9/1999 | Richards | |
| 6,537,169 B1 * | 3/2003 | Morii | 475/8 |
| 7,044,877 B2 * | 5/2006 | Ai | 475/5 |
| 7,204,781 B2 | 4/2007 | Hiraku | |
| 2012/0149516 A1 * | 6/2012 | Larrabee et al. | 475/5 |

FOREIGN PATENT DOCUMENTS

| | | |
|---|---|---|
| EP | 0102136 A1 | 3/1984 |
| EP | 1258658 A2 | 11/2002 |
| JP | 60107662 U | 7/1985 |

OTHER PUBLICATIONS

Search Report and Written Opinion; Application No. EP 11400046; dated May 21, 2012.

* cited by examiner

*Primary Examiner* — Edwin A Young
(74) *Attorney, Agent, or Firm* — Brooks Kushman P.C.

(57) ABSTRACT

A planetary gear (1, 20, 30, 40) for variable transmission, particularly a planetary gear for variable transmission towards a tail rotor of a helicopter. At least one gear set (s1, s2, s3, s4) of a sun gear (w4, w6, 21) comprises a ring gear (w1, w7), planetary wheels (2, 22, 32) and a planet carrier (w2, w3, w8). At least one clutch (k, K1, K2) and at least one freewheel (Fl, FL1, FL2) are provided for at least two different speeds of the planet carrier (w2, w3, w8) as output.

5 Claims, 1 Drawing Sheet

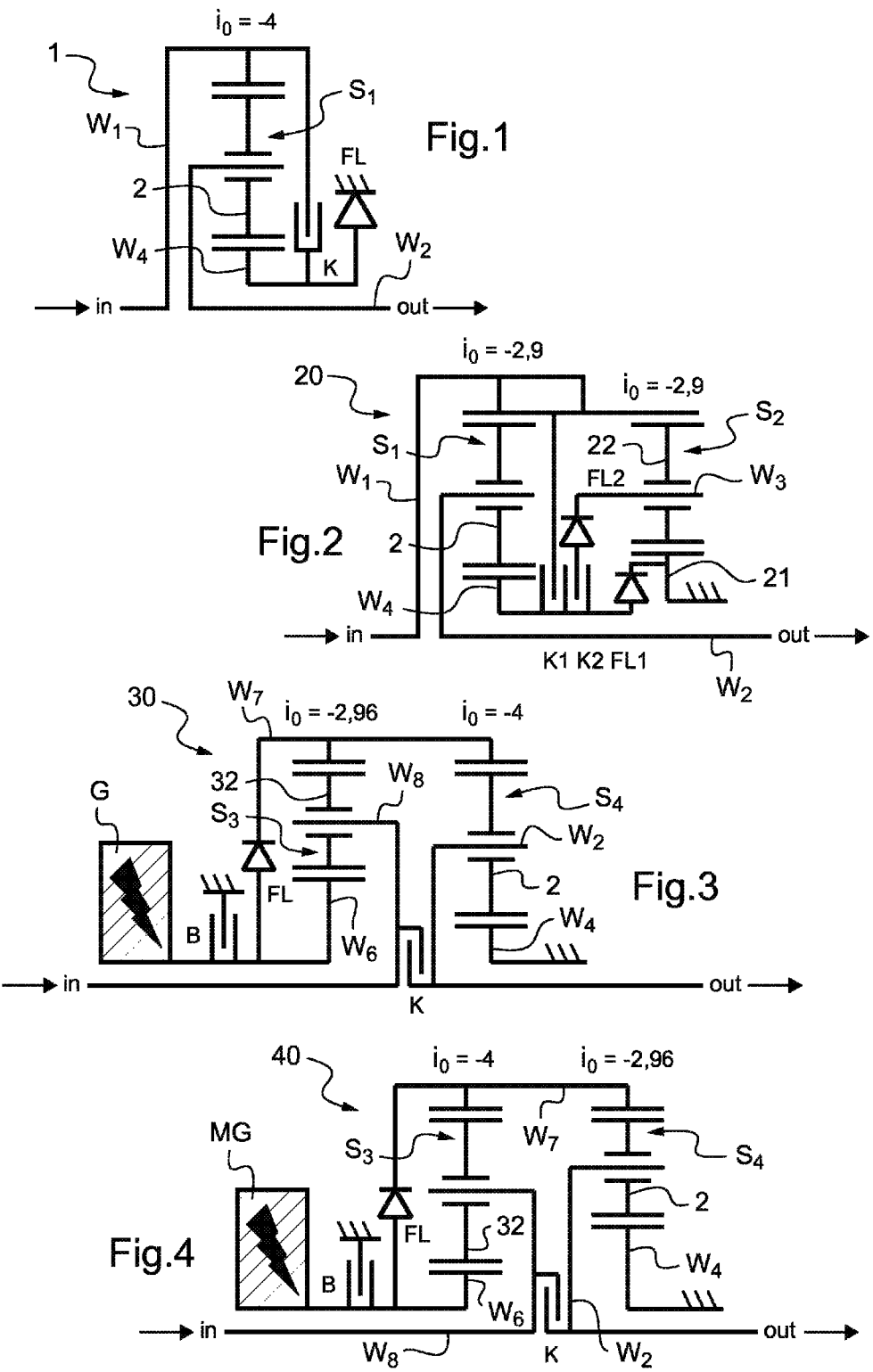

PLANETARY GEAR FOR VARIABLE TRANSMISSION

CROSS REFERENCE TO RELATED APPLICATIONS

This application claims priority to European patent application No. 11 400046.6 filed Oct. 20, 2011, the disclosure of which is incorporated in its entirety by reference herein.

BACKGROUND OF THE INVENTION (1) Field of the Invention

The invention relates to a planetary gear for variable transmission towards a tail rotor of a helicopter.

Main and tail rotors of helicopters are coupled to a transmission with a fixed ratio of speeds for said main and tail rotors. Such a fixed ratio of speeds for said main and tail rotors does not correspond to the needs for different flight situations, as for example during level flight almost no thrust is needed from the tail rotor. The operational height of the helicopter is as well limited due to said fixed ratio of speeds for said main and tail rotors, as during hovering in high altitude the rotational speed of the engine(s) of the helicopter has to be increased to speed up the tail rotor with the consequence of increased speed at the main rotor too, such increased speed at the main rotor not being needed.

(2) Description of Related Art

The document EP1 258 658 A2 discloses a transmission apparatus including at least an auxiliary transmission for supplementing a main transmission. The auxiliary transmission includes a damper which has a damper characteristic adapted to a low speed select state of the auxiliary transmission, and which is disposed in a low speed transmission path used for transmission of torque in the low speed select state of the auxiliary transmission. The auxiliary transmission further comprises a bypass member defining a bypass transmission path bypassing the low speed damper. The bypass transmission path is a torque path used for transmission of torque in a high speed select state of the auxiliary transmission.

The document JP 60 107 662 U discloses a transmission.

The document U.S. Pat. No. 5,030,187 A discloses an automatic transmission having a gear train comprising first, second and third single-pinion planetary gear sets. The ring gear (1R) of the first single-pinion planetary gear set is connected integrally or selectively to the carrier (2C) of the second single-pinion planetary gear set, the carrier (1C) of the first single-pinion planetary gear set is connected integrally or selectively to the ring gear (3R) of the third single-pinion planetary gear set, and the sun gear (2S) of the second single-pinion planetary gear set is connected integrally or selectively to the sun gear (3S) of the third single-pinion planetary gear set. The automatic transmission is capable of being placed in any one of at least five forward gears and one reverse gear.

The document EP 0 102 136 A1 discloses an epicyclic change-speed transmission which can include a sequence of either biratio stages, of quadriratio stages, or a combination of both. Each biratio stage has one binary selectable means, one reactive, one input, and one output component Each quadriratio stage has two binary selectable means, two reactive, one input, and one output component. The maximum ratio of the transmission results when the reactive components of the stages are grounded to the casing. When the reactive components of the plurality of stages are coupled to their input and output components in binary logic sequence, and incrementally decreasing variable speed ratio of the input/output members of the transmission will result, that far exceeds the number of stages. The basic stage ratio is defined by the maximum ratio of, and the number of biratio stages in the particularly defined transmission sequence, with the state ratios of the stages being of a particularly defined order. The total number of incremental changes in the ratio of the transmission is also particularly defined.

The document U.S. Pat. No. 3,209,618 A discloses a planetary gear for variable transmission, comprising a first gear set of a first sun gear, a ring gear, first planetary wheels and of a first planet carrier, a plurality of clutches and freewheels for adjustable speeds of the first planet carrier as output and further comprising a second gear set of a second sun gear, a ring gear, second planetary wheels and a second planet carrier.

The document U.S. Pat. No. 5,951,434 A discloses a transmission used as part of a drive unit to transmit power, coupled to a V6 engine drive shaft by a torque converter and includes an axially extending ring gear assembly, a sun gear positioned coaxially within part of the ring gear assembly and two planetary gear assemblies each spaced axially from the other and meshing with the sun gear and the ring gear assembly. The ring gear assembly is driven in rotation about its axis and an output drive shaft by the rotational forces of the motor output shaft and includes two different diameter annular ring gears which are each centered on and extend radially about the transmission axis.

The annular ring gears have different diameters and radially inwardly extending teeth. The sun gear includes a portion axially aligned within each of the two ring gears. A clutch plate or pack, gearing or other band or pressure brake is provided to selectively permit or prevent the rotation of the sun gear about the transmission axis and relative to the output drive shaft. A first planetary gear assembly includes one or more planetary gear pinions meshing with the teeth of the smaller diameter ring gear and its axially aligned portion of the sun gear. The planetary gear pinions are each rotatably mounted to a first planetary carriage which in turn is coupled to the output drive shaft. The second other planetary gear assembly includes at least one second planetary gear pinion meshing with the teeth of the larger diameter ring gear and the portion of the sun gear aligned therein. The second planetary gear pinions are rotatably mounted to pivots coupled to a second gear carriage which in turn is selectively rotatable about the axis. A brake is provided operable to permit or prevent the rotation of one or both of the first planetary gear carriage or the second planetary gear carriage relative to their respective pivots. A second brake provided to selectively lock or unlock the sun gear so as to permit or prevent its rotation relative to the transmission axis.

BRIEF SUMMARY OF THE INVENTION

It is an object of the invention to provide for a more flexible planetary gear for variable transmission, particularly a more flexible planetary gear for variable transmission adapted to a main and a tail rotor of a helicopter.

This object is solved with a planetary gear for variable transmission, particularly a variable transmission towards a tail rotor of a helicopter with the features of the claim 1. Preferred embodiments of the invention are presented in the subclaims.

According to the invention a planetary gear for variable transmission of rotations, particularly towards a tail rotor of a helicopter, comprises at least one gear set, such as a sun gear, a ring gear, planetary wheels and a planet carrier, and at least one clutch and at least one freewheel for at least two different speeds of the planet carrier as output of said planetary gear.

First and second sets of a sun gear, a ring gear, planetary wheels and of a planet carrier each, first and second clutches and first and second freewheels are provided for three different speeds of the planet carrier of the first set as output. Replacement of some couplings by freewheels reduces the number of switching elements to be actuated, said freewheels operating as automatic switching elements. The ring gear is for all three different speeds the driving gear for both sets. The sun gear of the first set is coupled via the first freewheel to the sun gear of the second set, said sun gear of the second set being fix. Said first freewheel is closed in a slow gear while the first and second clutches and the second freewheel are open.

The second clutch connects the sun gear of the first gear set via the closed second freewheel to the planet carrier of the second set in a middle gear whereas the sun gear of the first gear set is coupled to the ring gear of both gear sets in a fast gear. This preferred inventive planetary gear for variable transmission allows three discrete, different rotational speeds at its output towards the tail rotor. The inventive planetary gear for variable transmission allows an independent speed of the tail rotor of a helicopter, namely a speed being decoupled of the speed of the main rotor. Hence the speed of the tail rotor may be reduced or increased by means of the inventive planetary gear for improved overall performance of the helicopter due to variable transmission according to the specific needs of any flight situation such as allowing to overcome the altitude limitations related to the tail rotors of the state of the art. The independent tail rotor speed allows savings with regard to power and fuel and reduces the noise emitted by an operating helicopter as the inventive planetary gear for variable transmission is designed for reduced overall rotational speeds.

According to a further preferred embodiment of the invention third and fourth gear sets comprise each a sun gear, a ring gear, a planetary wheel and a planet carrier. One clutch, one break and one freewheel are provided for said third and fourth gear sets for three different speeds of the planet carrier of the fourth gear set as output. The planet carrier of the third gear set is the driven gear, the sun gear of the third gear set is preferably coupled to an electric generator and the sun gear of the fourth gear set is fix. Said freewheel couples the ring gear of the third and fourth gear sets to the sun gear of the third gear set when it is closed in a slow gear while the clutch and the break are open. Said clutch is closed to connect the planet carrier of the third gear set to the planet carrier of the fourth gear set in a middle gear while the freewheel and the break are open, whereas the sun gear of the third gear set is fixed via the break in a fast gear while the clutch and the freewheel are open.

This preferred inventive planetary gear for variable transmission allows an efficient concept for three different rotational speeds towards the tail rotor. The electric generator allows control to modulate the speed of the sun gear of the third gear set and consequently control of the speed between the slow and the high gear of the planet carrier of the fourth gear set as the output. This preferred inventive planetary gear for variable transmission of an input speed allows the three different rotational speeds at the output and continuous variation of all the speeds in between towards the tail rotor and an option to deviate excess power to generate electric energy for supply to the onboard grid.

According to a further preferred embodiment of the invention an electric motor/generator is coupled to the sun gear of the third set, the rotation of said electric motor/generator modulating the speeds of the planet carrier of the fourth set between the slow and the high gear, with maximum power being absorbed by said electric motor/generator at the slow gear while minimum power is absorbed by said electric motor/generator at the middle gear, minimum power is supplied by said electric motor/generator at the middle gear between the middle gear and the fast gear while the maximum power supply by said electric motor/generator is reached at the fast gear.

This preferred inventive planetary gear for variable transmission of an input speed allows the three different rotational speeds at the output and continuous variation of all the speeds in between towards the tail rotor with an option to deviate excess power from the inventive planetary gear to said electric motor/generator working as a generator to generate electric energy for the onboard grid and an option to use electric energy from the onboard grid in said electric motor/generator working as a motor in order to boost the output of the inventive planetary gear to a higher level for faster rotation of the tail rotor.

Preferred embodiments of the invention are presented in the attached drawings.

BRIEF DESCRIPTION OF THE SEVERAL VIEWS OF THE DRAWINGS

FIG. 1 shows a schematic sketch of a planetary gear according to the invention,

FIG. 2 shows a schematic sketch of a second embodiment of the planetary gear according to the invention, FIG. 3 shows a schematic sketch of a third embodiment of the planetary gear according to the invention, and FIG. 4 shows a schematic sketch of a fourth embodiment of the planetary gear according to the invention.

DETAILED DESCRIPTION OF THE INVENTION

According to FIG. 1, a planetary gear 1 with a slow and a fast gear for variable transmission from a main rotor towards a tail rotor (not shown) of a helicopter comprises one gear set s1 with a sun gear w4, a ring gear w1, planetary wheels 2 and a planet carrier w2.

The ring gear w1 is the drive gear (input) of the gear set s1, said input being provided from a gear box of the main rotor (not shown). The sun gear w4 is coupled to a freewheel FL, that stops the sun gear w4 relative to a casing of the planetary gear 1 if it is closed. A clutch K is provided to connect the ring gear w1 to the sun gear w4. In the slow gear said ring gear w1 turns the planetary wheels 2 relative to the sun gear w4 of said gear set s1 thus turning the planet carrier w2 with a reduced speed relative to the ring gear w1. In the fast gear the driven ring gear w1 is coupled via the clutch K to the sun gear w4 of set s1 while the freewheel FL runs freely and with all gears of set s1 being blocked relative to each other the planetary wheels 2 turn the planet carrier w2 with the high input speed of the ring gear w1.

With a ratio of $i_0=-4$ and a maximum input speed of the ring gear w1 of $n_{in}=4840$ rpm the parameters of the planetary gear 1 result as follows:

|  | K | FL |
|---|---|---|
| $T_{max}$ [Nm] | 92 | 16 |
| $n_{max}$ [rot/min] | 4840 | 4840 |
| Gear | i | η |
| Slow | 1.25 (80%) | 99.6% |
| Fast | 1.00 (100%) | 100% |

According to FIG. 2, corresponding features are referred to with the same references as in FIG. 1. A planetary gear 20 comprises first and second gear sets s1, s2, with the first gear set s1 comprising the first sun gear w4, the first ring gear w1, the planetary wheels 2 and the planet carrier w2 and the second gear set s2 comprising a fix sun gear 21, a ring gear integral with the first ring gear w1, second planetary wheels 22 and a second planet carrier w3.

First and second clutches K1, K2 and first and second freewheels FL1, FL2 are provided. First clutch K1 couples the sun wheel w4 to the ring gear w1 of the first gear set s1 and second clutch K2 couples the sun wheel w4 to the second freewheel FL2, said closed first freewheel FL1 connecting the sun wheel w4 of the first gear set s1 to the fix sun gear 21 of the second gear set s2 the sun gear 21 being fix relative to a casing of the planetary gear 20. The closed second freewheel FL2 connects the sun wheel w4 of the first gear set s1 to the second planet carrier w3 if the second clutch K2 is closed at the same time. The second freewheel FL2 got the effect that clutch K2 does not have to be opened during the changeover into the fast gear. Due to the second freewheel FL2 a kinematic disconnection is realized.

In a slow gear of planetary gear 20 said first freewheel FL1 is closed while the first and second clutches K1, K2 are open. Consequently the sun gear w4 of the first gear set s1 is blocked and the planetary wheels 2 are driven by the ring gear w1 to rotate relative to the sun gear w4. The output speed of the planetary gear 20 is transmitted by the planetary wheels 2 from the input speed of the ring gear w1 to the planet carrier w2 of the first gear set s1.

In a middle gear of planetary gear 20 said second freewheel FL2 and the second clutch K2 are closed while the first clutch K1 and the first freewheel FL1 are open, connecting the sun gear w4 of the first set s1 via the closed second clutch K2 and the closed second freewheel FL2 to the planet carrier w3 of the second gear set s2. The input drive is again provided by the ring gear w1. Consequently the sun gear w4 of the first gear set s1 turns with the planet carrier w3 of the second gear set s2, the speed of said planet carrier w3 resulting from the rotational speed of the planetary wheels 22 driven by the ring gear w1 relative to the fix sun gear 21. The input speed of the ring gear w1 and the speed of the sun gear w4 determine the rotational speed of the planetary wheels 2 and thus the rotational speed of the planet carrier w2 of the first gear set s1 as the middle output speed of planetary gear 20.

In a fast gear of planetary gear 20 the driven ring gear w1 is coupled via the clutch K1 to the sun gear w4 of gear set s1 while the freewheels FL1, FL2 run freely and the second clutch K2 is open. The whole gear set s1 acts as a stiff transmission link with the planetary wheels 2 turning the planet carrier w2 with the input speed of the ring gear w1 and thus transmitting the high input speed in a ratio of 1:1 to the high output speed of planetary gear 20.

The scheme of actuations for the first and second clutches K1, K2 and first and second freewheels FL1, FL2 of planetary gear 20 are provided as follows:

| Gear | K1 | K2 | FL1 | FL2 |
|---|---|---|---|---|
| Slow | | | X | (X) |
| Middle | | X | | X |
| Fast | X | (X) | | |

If the first clutch K1 is closed it doesn't matter whether the second clutch K2 (in parenthesis) is closed or not and if the first freewheel FL1 is closed it doesn't matter whether the second freewheel FL2 (in parenthesis) is closed or not.

With a ratio of $i_0=-2.9$ for each of the first and second gear sets s1, s2 the parameters of the planetary gear 20 result as follows:

| | K1 | K2 | FL1 | FL2 |
|---|---|---|---|---|
| $T_{max}$ [Nm] | 111 | 27 | 20 | 27 |
| $n_{max}$ [rot/min] | 5179 | 3851 | 5179 | 1328 |

| Gear | I | η |
|---|---|---|
| Slow | 1.35 (79.2%) | 99.5% |
| Middle | 1.07 (100%) | 99.9% |
| Fast | 1.00 (107%) | 100% |

According to FIG. 3 corresponding features are referred to with the same references as in FIGS. 1 and 2. A planetary gear 30 comprises motor bound and casing bound gear sets s3 and s4 with the motor bound gear set s3 comprising a motor bound sun gear w6, a motor bound ring gear w7, planetary wheels 32 and a driven planet carrier w8 as input. The casing bound gear set s4 comprises the sun gear w4, a ring gear integral with the first ring gear w7, planetary wheels 2 and the planet carrier w2 as output. A generator G, one clutch K, one break B and one freewheel FL are provided.

Clutch K couples the planet carrier w8 of the motor bound gear set s3 to the planet carrier w2 of the casing bound gear set s4. Actuated break B stops the sun gear w6 of the motor bound gear set s3 and isolates any contribution of generator G to the planetary gear 30. The closed freewheel FL connects the motor bound sun wheel w6 of the motor bound gear set s3 to the ring gear w7 of the motor bound and casing bound gear sets s3, s4. The sun gear w4 of the casing bound gear set s4 is fix.

In a slow gear of planetary gear 30 said freewheel FL is closed while the clutch K and break B are open. Consequently the sun gear w6 of the motor bound set s3 with the generator G is coupled to the ring gear w7 of both gear sets s3, s4. The input speed of planetary gear 30 is transmitted 1:1 from the driven planet carrier w8 to the motor bound set s3 and the output speed of planetary gear 30 is transmitted by the planetary wheels 2—that are driven by the ring gear w7 to rotate relative to the fix sun gear w4—to the planet carrier w2 of the fourth gear set s4 as low speed output of planetary gear 30.

In a middle gear of planetary gear 30 said clutch K is closed while the break B and the freewheel FL are open, said clutch K connecting the driven planet carrier w8 of the motor bound set s3 via the closed clutch K to the planet carrier w2 of the casing bound gear set s4. Consequently the planet carrier w8 of the motor bound gear set s3 turns with the planet carrier w2 of the casing bound gear set s4 and the rotational speed of the input at the driven planet carrier w8 is equal to said middle output speed of planetary gear 30.

In a fast gear of planetary gear 30 the break B is actuated and the rotational speed of the sun gear w6 of the motor bound set s3 is =0 while the freewheel FL and the clutch K are open. The input of the driven planet carrier w8 of the motor bound gear set s3 is transmitted via the rotating planetary wheels 32 to the ring gear w7 and from there to the planetary wheels 2 rotating relative to the fix sun gear w4 of the casing bound gear set s4 thus transmitting rotation to the planet carrier w2 of the casing bound gear set s4 as high speed output.

Any rotational speed of the output of the planetary gear 30 in the spreads between the slow gear and the middle gear and the middle gear and the fast gear of planetary gear 30 is continuously adjustable by continuously varying the resistance of the generator G mounted to the motor bound sun gear w6. The maximum power is absorbed by said generator G at the low gear while the minimum power is absorbed by said generator G at the fast gear, the generator G bringing the motor bound sun gear w6 to a stop towards the fast gear allowing an actuation of the break B virtually free of wear, once the fast gear of the planetary gear 30 is reached.

Thus the generator G does not consume any power from the planetary gear 30 while the maximum power is transferred to the tail rotor at high speed whereas the planetary gear 30 absorbs the maximum power from the planetary gear 30 for supplying electric energy to the onboard electric grid of the helicopter, when the minimum power is transferred from the main rotor to the tail rotor at low speed.

With a ratio of $i_0=-2.96$ for the motor bound gear set s3 and a ratio of $i_0=-4$ for the casing bound gear set s4 the discrete parameters of the planetary gear 30 result as follows: With an input rotational speed of 100% at the driven planet carrier w8 of the motor bound gear set s3 the output rotational speed at the planet carrier w2 of the casing bound gear set s4 is 80% at low speed, 100% at middle speed and 107% at high speed.

According to FIG. 4 corresponding features are referred to with the same references as in FIG. 1-3. A planetary gear 40 resembles principally in its structure to the planetary gear 30 with the difference that the planetary gear 40 has the ratio of $i_0=-2.96$ for the casing bound gear set s4 and the ratio of $i_0=-4$ for the motor bound gear set s3 and the further difference that the sun gear w6 of the motor bound gear set s3 is coupled to an electric motor/generator MG.

The slow gear of planetary gear 40 is set as the slow gear of planetary gear 30, namely the freewheel FL is closed while the clutch K and break B are open, with the consequences as described.

In the middle gear of planetary gear 40 said break B is closed while the clutch K and the freewheel FL are open. The input of the driven planet carrier w8 of the motor bound gear set s3 is transmitted via the rotating planetary wheels 32 to the ring gear w7 and from there to the planetary wheels 2 rotating relative to the fix sun gear w4 of the casing bound gear set s4 thus transmitting rotation to the planet carrier w2 of the casing bound gear set s4 as middle speed output.

In a fast gear of planetary gear 40 the clutch K is actuated while the freewheel FL and the break B are open. Said clutch K connects the driven planet carrier w8 of the motor bound set s3 via the closed clutch K to the planet carrier w2 of the casing bound gear set s4. Consequently the planet carrier w8 of the motor bound gear set s3 turns with the planet carrier w2 of the casing bound gear set s4 and the rotational speed of the input at the driven planet carrier w8 is equal to the high output speed of the planetary gear 40.

Any rotational speed of the output of the planetary gear 40 in the spreads between the slow gear and the middle gear and the middle gear and the fast gear of planetary gear 40 is continuously adjustable by continuously varying the power exchange with the electric motor/generator MG mounted to the motor bound sun gear w6. The maximum power is absorbed by said electric motor/generator MG working as a generator at the low gear while no power is absorbed by said electric motor/generator MG at the middle gear, the electric motor/generator MG bringing the motor bound sun gear w6 to a stop at the middle gear allowing an actuation of the break B virtually free of wear, once the middle gear of the planetary gear 40 is reached. No power is supplied by said electric motor/generator MG to the planetary gear 40 at the middle gear, between the middle gear and the fast gear the motor/generator MG is working as a motor while the maximum power supply to the planetary gear 40 by said electric motor/generator MG as a motor is reached at the fast gear.

Thus the electric motor/generator G supplies increasingly power to the planetary gear 40 from the middle gear to the fast gear and absorbs increasingly power from the middle gear to the slow gear.

The discrete parameters of the planetary gear 40 result as follows: With an input rotational speed of 107% at the driven planet carrier w8 of the motor bound gear set s3 the output rotational speed at the planet carrier w2 of the casing bound gear set s4 is 80% at low speed, 100% at middle speed and 107% at high speed.

What is claimed is:

1. A planetary gear for variable transmission towards a tail rotor of a helicopter, comprising:
   a first gear set comprising a first sun gear, a ring gear, first planetary wheels and a first planet carrier;
   a first clutch and a first freewheel for at least two different speeds of the first planet carrier as output;
   a second gear set comprising a second sun gear, the ring gear, second planetary wheels and a second planet carrier, wherein the first sun gear of the first gear set is coupled via the first freewheel to the second sun gear of the second gear set, the second sun gear of the second gear set being fixed, the first freewheel being closed in a slow gear; and
   a second clutch connecting the first sun gear of the first gear set via a closed second freewheel to the second planet carrier of the second gear set in a middle gear, wherein the first sun gear of the first set is coupled via the first clutch to the ring gear of both sets in a fast gear.

2. A planetary gear for variable transmission towards a tail rotor of a helicopter, comprising:
   a first casing bound gear set comprising a first sun gear, a ring gear, first planetary wheels and a first planet carrier;
   a first clutch and a first freewheel for at least two different speeds of the first planet carrier as output; and
   a second motor bound gear set comprising a second sun gear, the ring gear, second planetary wheels and a second planet carrier, wherein the ring gear of the second motor bound gear set and the first casing bound gear set is non driven, the second planet carrier of the second motor bound gear set is driven, the first sun gear of the first casing bound gear set is fixed, the first freewheel coupling the ring gear of both motor bound and casing bound gear sets to the second sun gear of the second motor bound set being closed in a slow gear, and the first clutch connecting the driven second planet carrier of the second motor bound set to the first planet carrier of the first casing bound set in a middle gear.

3. The planetary gear according to claim 2, wherein an electric generator is coupled to the second sun gear of the second motor bound set, the rotation of the electric generator modulating the speeds of the first planet carrier of the first casing bound set between the slow and a fast gear.

4. The planetary gear according to claim 2, wherein an electric motor/generator is coupled to the second sun gear of the second motor bound set, the rotation of the electric motor/generator modulating the speeds of the first planet carrier of the first casing bound set between the slow and a fast gear, with maximum power being absorbed by the electric motor/generator working as a generator at the slow gear while no power is absorbed by the electric motor/generator at the middle gear, minimum power is supplied by the electric motor/generator subsequent to the middle gear, while the maximum power supply is reached at the fast gear to the electric motor/generator, working as a motor at the fast gear.

5. A variable transmission for a helicopter tail rotor, the transmission comprising:
- a first simple planetary gear set having a first sun gear, a first ring gear, a first planet carrier, and at least a first planet gear supported for rotation on the first planet carrier, the first planet carrier being connectable to an output shaft;
- a second simple planetary gear set having a second sun gear, a second ring gear, a second planet carrier, and at least a second planet gear supported for rotation on the second planet carrier, wherein the second sun gear is fixed and the second ring gear is fixedly coupled to the first ring gear;
- a first clutch configured to selectively couple the first sun gear to the first ring gear;
- a first freewheel configured to selectively couple the first sun gear to the second sun gear; and
- a second clutch configured to selectively couple the first sun gear to the second planet carrier via a second freewheel.

\* \* \* \* \*